Feb. 17, 1942.                L. O. SMITH                2,273,666
                         HARVESTER ATTACHMENT
                         Filed Aug. 26, 1940
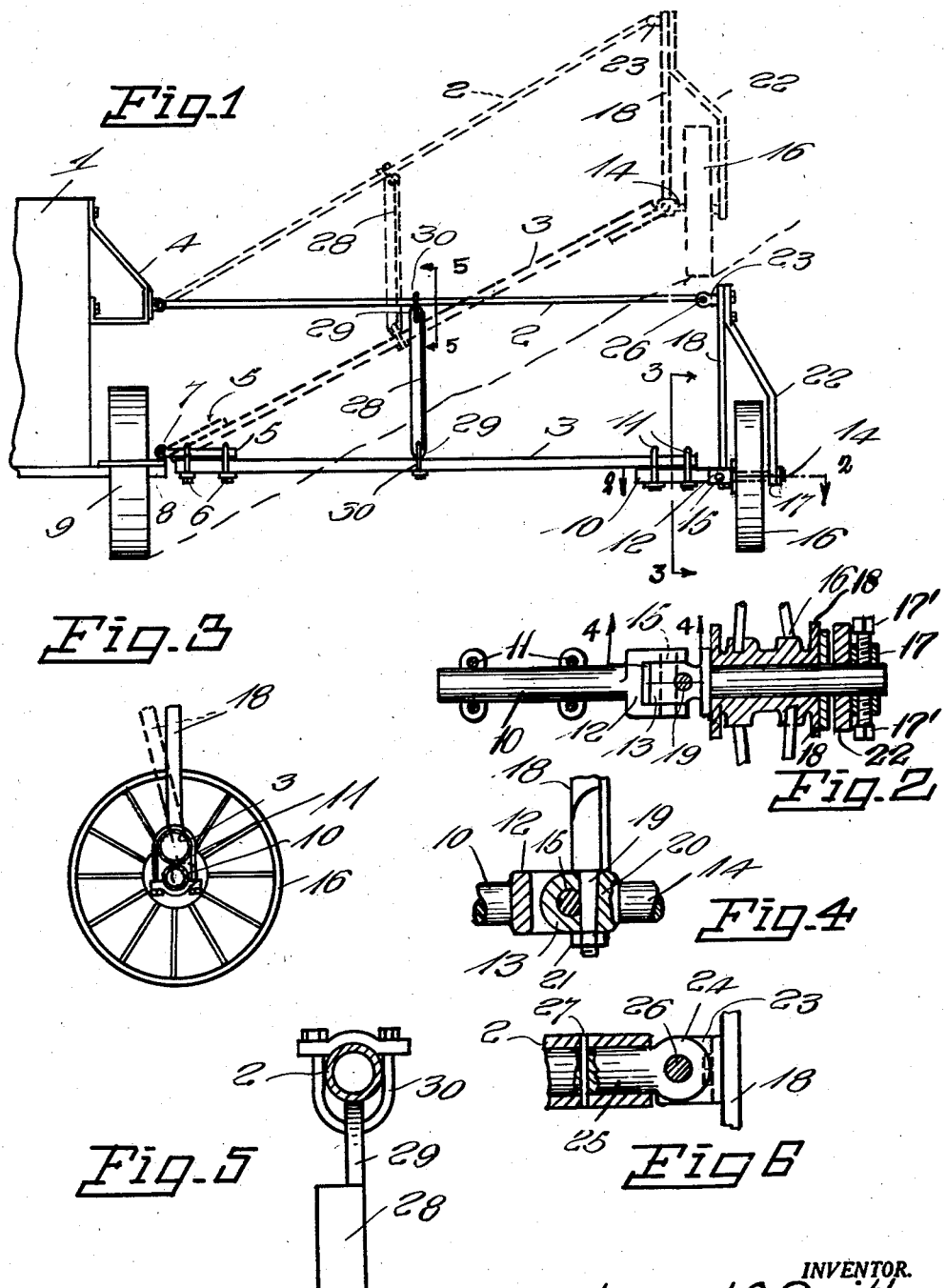
INVENTOR.
Leonard O. Smith
BY
Glenn L. Fish
ATTORNEYS.

Patented Feb. 17, 1942

2,273,666

UNITED STATES PATENT OFFICE 2,273,666

HARVESTER ATTACHMENT

Leonard O. Smith, Spokane, Wash.

Application August 26, 1940, Serial No. 354,303

3 Claims. (Cl. 56—209)

This invention relates to a side hill device and it is one object of the invention to provide a device of this character which is particularly adapted for use in connection with a combine harvester and serves to permit operation of the harvester across a side of a hill.

Another object of the invention is to so form and mount the device that it may accommodate itself to the slope of a hill across which a harvester is moving.

Another object of the invention is to provide an attachment of this character which is provided with means for retaining upper and lower bars thereof parallel and a wheel at the outer end of the device at all times in a vertical plane so that the outer wheel may serve very effectively to prevent side drift.

Another object of the invention is to provide a device of this character which is strong and durable and capable of being easily applied to a harvester of conventional construction.

In the accompanying drawing:

Fig. 1 is a view in elevation showing the device applied to a harvester.

Fig. 2 is a fragmentary sectional view taken longitudinally through the outer end portion of the device, on the line 2—2 of Fig. 1.

Fig. 3 is a fragmentary view taken on the line 3—3 of Fig. 1.

Fig. 4 is a sectional view on the line 4—4 of Fig. 2.

Fig. 5 is a sectional view on the line 5—5 of Fig. 1.

Fig. 6 is an enlarged sectional view of the joint at the outer end of the upper bar of the device.

This device constitutes an attachment particularly adapted for use with a combine harvester 1, but it is to be understood that it may be applied to other farm implements. The device extends from one side of the combine harvester and is pivotally mounted at its inner end so that it may accommodate itself to the slope of a hill across which it moves.

The upper and lower bars 2 and 3 of the device are formed of pipe or other strong metal tubing of the proper length and, at its inner end, the upper bar 2 is pivoted to a bracket 4 which is secured to a side of the harvester in position to project laterally therefrom. The sickle-bar and draper are supported on the lever bar or axle 3 in front thereof but have not been shown for the sake of clearness, and it is to be understood that they are mounted in the usual manner. A stub shaft 5 is secured to the inner end portion of the lower bar 3 by clamps 6 and this stub shaft projects from the lower bar and is pivoted, as shown at 7, to the portion of the frame which projects from a side of the combine. The combine is equipped with the usual wheels 9, only one of which is shown.

At its outer end, the bar or axle 3 carries a stub shaft 10 which is secured by clamps 11 and projects from the outer end of the axle. At its outer end the stub shaft 10 is formed with a clevis 12 with which the head 13 at the inner end of the stub axle 14 is connected by a pin 15. The wheel 16 is rotatably mounted on the axle 14 and held in place thereon by a collar 17 held in fixed position on the axle by set screws 17'. The standard 18, which extends upwardly from the inner end of the stub axle, is provided at its lower end with a depending pin 19 which tapers downwardly and is fitted into a downwardly tapered opening 20 formed vertically through the head 13, and upon referring to Fig. 4, it will be seen that this pin engages a side portion of the pin 15 to hold same in place and prevent it from working loose and slipping out of the head 13 and the clevis 12. A nut 21, which is applied to the protruding lower end of pin 19, prevents this pin from shifting upwardly out of place. By loosening the clamps 11 the upright may be angularly adjusted, as indicated by dotted lines in Fig. 3, and the clamps then again tightened to firmly secure the upright in adjusted position. This will adjust the angular relation which the wheel mounting has to the lower bar and control engagement of the wheel with the ground. A side arm 22, which has its lower end formed with the collar 17, has its upper end united to the upper end portion of the standard 18. Therefore, the outer end of the stub axle 14 will be supported and braced against strains.

A bearing bracket 23 is secured to the upper end of the standard 18 and this bracket projects inwardly from the standard and is pivoted to the head 24 of a short bar or shaft 25 by a pin 26. The shaft 25 fits into the outer end portion of the tubular bar 2 and is firmly secured therein by a pin 27. It will thus be seen that the standard has its upper and lower ends pivotally connected with the upper and lower bars 2 and 3 and will always remain in upright position irrespective of the angle at which the bars 2 and 3 extend. Therefore, the wheel 16 will always turn about a horizontal axis and will follow a horizontal track along the sloping surface of a hill and prevent side drift during use of the harvester.

In order to brace the bars 2 and 3 midway the length of the device and maintain them in proper parallel relation to each other, there has been provided a bracing bar 28 formed of angle metal and having its ends formed with ears 29 through which U-bolts 30 are passed to connect the brace with the bars. By this arrangement, the bars will be braced midway the length of the device and will always remain parallel to each other and be prevented from being flexed or bent transversely out of their proper position.

Having thus described the invention, what is claimed is:

1. A device of the character described comprising upper and lower bars having means at their inner ends for pivotally connecting the bars with a harvester and mounting the device laterally of the harvester for vertical swinging movement, a stub axle extending longitudinally of the lower bar and projecting outwardly therefrom, said stub axle being mounted for vertical pivotal movement, a ground engaging wheel carried by said axle, an upright fixed at its lower end to the stub axle and having its upper end pivoted to the outer end of the upper bar for vertical pivotal movement, a bracing bar extending vertically between the upper and lower bars midway the length of the device and having perforated ears at its ends, and clamps secured about the upper and lower bars and passing through the ears to hold the bracing bar in place and permit pivotal movement of the brace to maintain the brace vertical in parallel relation to the standard.

2. A device of the character described comprising upper and lower bars having means at their inner ends for pivotally connecting the bars with a harvester and mounting the device laterally of the harvester at one side thereof for vertical tilting movement, a bracket secured to the lower bar longitudinally thereof having a bearing at its outer end presented outwardly of the bar, a stub axle extending longitudinally of the lower bar with its inner end pivoted to the bearing for vertical swinging movement, a ground wheel rotatably mounted on the axle, a standard extending upwardly from the inner end of the axle and having its upper end pivoted to the outer end of the upper bar for vertical swinging movement and serving to hold the bars in parallel spaced relation to each other while maintaining the axle horizontal, and an arm extending outwardly from the upper end of the standard over the wheel and downwardly outwardly of the wheel with its lower end engaged about and supporting the outer end portion of the stub axle.

3. A device of the character described comprising upper and lower bars having means at their inner ends for pivotally connecting the bars with a harvester and mounting the device laterally of the harvester at one side thereof for vertical tilting movement, a bracket secured to the lower bar longitudinally thereof and having forks at its outer end, a stub axle extending longitudinally of the bracket outwardly thereof and having a bearing head at its inner end fitting between the forks of the bracket, a pivot pin passing through the forks and the head to pivotally mount the axle for vertical tilting movement, a standard extending vertically and having a depending pin at its lower end passing through the head of the stub axle and interlocked with the pivot pin to hold the pivot pin in place, and means pivotally connecting the upper end of the standard with the outer end of the upper bar.

LEONARD O. SMITH.